(12) United States Patent
Inoue

(10) Patent No.: US 12,045,527 B2
(45) Date of Patent: Jul. 23, 2024

(54) INFORMATION PROCESSING APPARATUS HAVING EXTERNAL FIRST AND SECOND JOB PROCESSING, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Yuki Inoue, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/137,554

(22) Filed: Apr. 21, 2023

(65) Prior Publication Data

US 2023/0350618 A1 Nov. 2, 2023

(30) Foreign Application Priority Data

May 2, 2022 (JP) .................................. 2022-075942

(51) Int. Cl.
*G06F 3/12* (2006.01)

(52) U.S. Cl.
CPC .............. *G06F 3/126* (2013.01); *G06F 3/121* (2013.01); *G06F 3/1212* (2013.01); *G06F 3/1267* (2013.01); *G06F 3/1274* (2013.01)

(58) Field of Classification Search
USPC ....................................................... 358/1.14
See application file for complete search history.

(56) References Cited

U.S. PATENT DOCUMENTS

| 6,148,164 A * | 11/2000 | Shima .................... G06K 15/00 358/1.12 |
| 7,707,325 B2 | 4/2010 | Kawasaki |
| 7,945,712 B2 | 5/2011 | Kawasaki |
| 2001/0056406 A1* | 12/2001 | Nagoya .................. G06Q 30/06 705/52 |
| 2007/0070386 A1* | 3/2007 | Yamada ............... G06K 15/005 358/1.14 |
| 2008/0316530 A1* | 12/2008 | Kurihara ............... G06F 3/1259 358/1.15 |
| 2014/0376023 A1* | 12/2014 | Anno .................. G06K 15/1823 358/1.14 |
| 2021/0149613 A1* | 5/2021 | Kopparthi ............. G06F 3/1267 |

FOREIGN PATENT DOCUMENTS

JP 2007-011469 A 1/2007

OTHER PUBLICATIONS

Yuki Inoue, U.S. Appl. No. 18/223,633, filed Jul. 19, 2023.

* cited by examiner

*Primary Examiner* — Jacky X Zheng
(74) *Attorney, Agent, or Firm* — VENABLE LLP

(57) ABSTRACT

A method of controlling an information processing apparatus includes transmitting a first job to a job processing apparatus, executing first control for holding the first job in a job queue that the information processing apparatus has in a state where processing based on the first job is executed in the job processing apparatus, and executing second control for terminating holding of the first job by the job queue based on a fact that a second job is registered in the job queue in a state where the first job is held in the job queue even in a case where the processing based on the first job is executed in the job processing apparatus. The first control includes control not to transmit an EndJob command even though transmission of the first job is completed.

24 Claims, 19 Drawing Sheets

| PRINTER A | | | | 205 |
|---|---|---|---|---|
| DOCUMENT NAME | STATE | OWNER | NUMBER OF PAGES | |
| JOB A | PRINTING IS BEING PERFORMED | USER A | 3 | |
| JOB B | | USER A | 1 | |

FIG.3

| PRINTER A | | | |
|---|---|---|---|
| DOCUMENT NAME | STATE | OWNER | NUMBER OF PAGES |
| JOB A | PRINTING IS BEING PERFORMED | USER A | 1 |

FIG.13A

| PRINTER A | | | |
|---|---|---|---|
| DOCUMENT NAME | STATE | OWNER | NUMBER OF PAGES |
| JOB B | | USER B | 1 |

FIG.13B

INFORMATION PROCESSING APPARATUS HAVING EXTERNAL FIRST AND SECOND JOB PROCESSING, METHOD OF CONTROLLING INFORMATION PROCESSING APPARATUS, AND STORAGE MEDIUM

BACKGROUND

Field

The present disclosure relates to an information processing apparatus, a method of controlling the information processing apparatus, and a program.

Description of the Related Art

Conventionally, there has been known an information processing apparatus capable of transmitting a job to an external device such as a printer to cause the printer to perform processing based on the job. A user, for example, can know whether a job has been transmitted to a printer by viewing a print queue in Windows (registered trademark) of Microsoft Corporation. However, at this time, even in a case where the user can know that the job has been transmitted to the printer, it is difficult for the user to know whether the printer has completed job processing.

Japanese Patent Laid-Open No. 2007-011469 (hereinafter referred to as Literature 1) discloses a technique of monitoring the state of a job by causing a spooler provided in an information processing apparatus to hold the job until a printer completes job processing. This technique is called job holding processing and has an advantage that the job can be cancelled before the printer completes the job processing.

SUMMARY

During execution of the job holding processing, the processing of a next job is not started until the processing of the job in the process of printing is completed. Thus, printing takes longer than that in a case where the job holding processing is not executed. There is a need for a technique of increasing printing efficiency by suitably switching between the start and end of the job holding processing.

A method of controlling an information processing apparatus according to an aspect of the present disclosure includes transmitting a first job to a job processing apparatus, executing first control for holding the first job in a job queue that the information processing apparatus has in a state where processing based on the first job is executed in the job processing apparatus, and executing second control for terminating holding of the first job by the job queue based on a fact that a second job is registered in the job queue in a state where the first job is held in the job queue even in a case where the processing based on the first job is executed in the job processing apparatus.

Further features of the present invention will become apparent from the following description of exemplary embodiments with reference to the attached drawings.

BRIEF DESCRIPTION OF THE DRAWINGS

FIG. 3 is a diagram showing an example of a print queue;
FIG. 11 is a flowchart for explaining the job holding processing in a case where there is a print job standing by;
FIGS. 13A and 13B are diagrams showing an example of a plurality of print queues.

DESCRIPTION OF THE EMBODIMENTS

Preferred embodiments of the present disclosure will be described in detail below with reference to the accompanying drawings. Incidentally, the following embodiments do not limit the present disclosure according to claims, and not all combinations of features described in the present embodiments are essential to a solution in the present disclosure.

First Embodiment

A description will be given of an information processing apparatus to which the present embodiment is applied and an external device connected to the information processing apparatus to which the present embodiment is applied. In the present embodiment, a personal computer (hereinafter referred to as a PC) is shown as an example of information processing apparatuses. It should be noted that not only a PC but also various devices such as an image processing apparatus, a mobile terminal, a smart phone, a notebook PC, or a tablet terminal can be applied to the information processing apparatus. Further, an inkjet printer capable of communicating with the information processing apparatus is shown as an example of external devices connected to the information processing apparatus to which the present embodiment is applied. Incidentally, as the external device, an image processing apparatus other than an inkjet printer, a PC, a mobile terminal, a smart phone, a tablet terminal, or the like can also be used. The image processing apparatus other than an inkjet printer is, for example, a full-color laser beam printer, a monochrome printer, a copier, a facsimile, or the like. Furthermore, those apparatuses may be multi-functional or single-functional.

Figure 1:
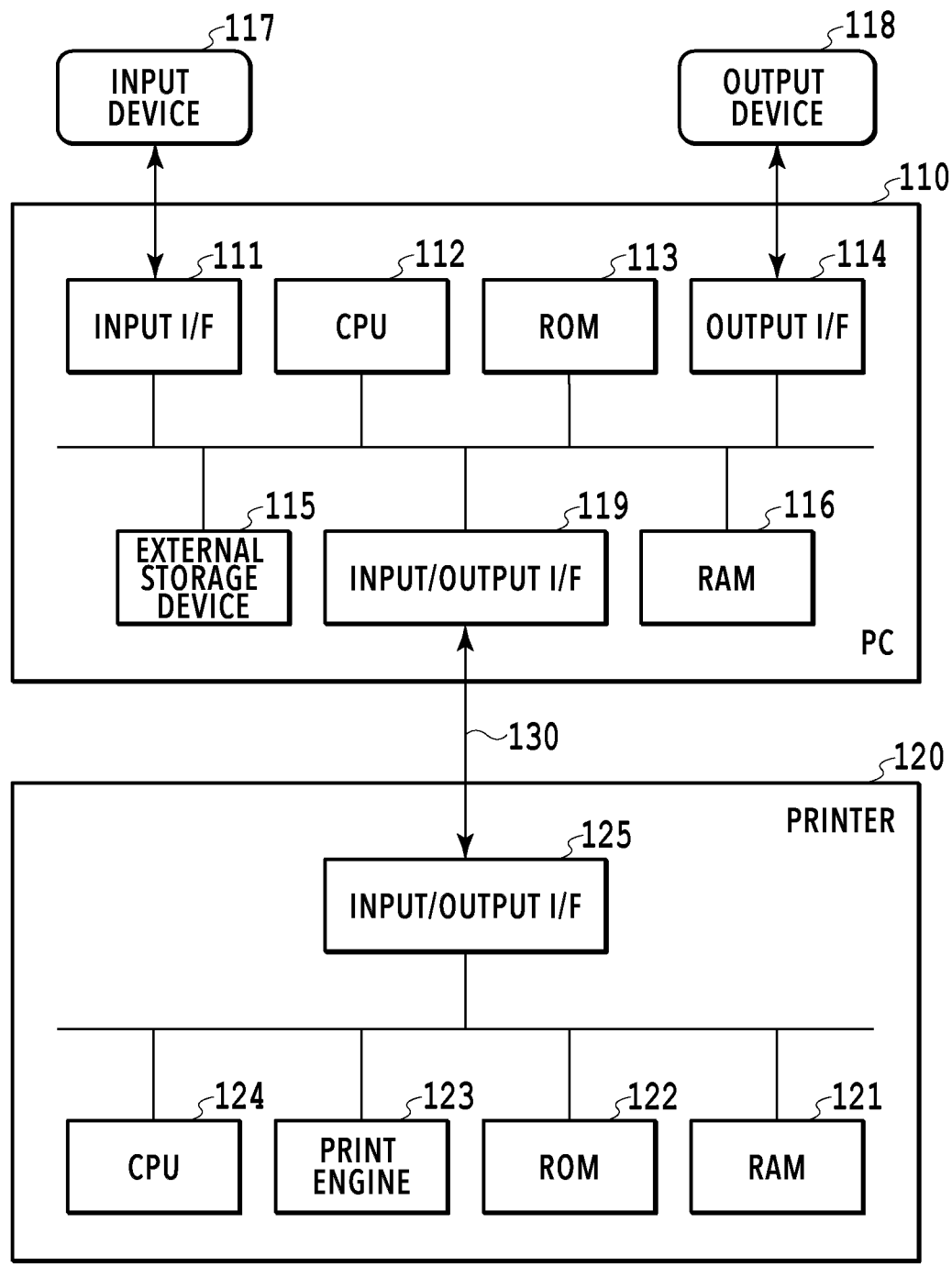
FIG. 1 is a block diagram showing a system configuration.

FIG. 1 is a block diagram for a communication system having an information processing apparatus according to the present embodiment and an external device. The present embodiment describes the following configuration as an example, but the present embodiment is applicable to an information processing apparatus capable of communicating with an external device, and does not specifically limit any function as shown in this figure.

A PC 110 is an information processing apparatus in the present embodiment. The PC 110 includes an input I/F 111, a CPU 112, a ROM 113, an output I/F 114, an external storage device 115, a RAM 116, an input device 117, an output device 118, and an input/output I/F 119.

The CPU 112 is a system control unit and controls the entire PC 110. The ROM 113 stores a control program executed by the CPU 112 or fixed data such as a data table. The external storage device 115 stores an operating system (hereinafter referred to as an OS), a printer driver, or various other types of data and software. In the present embodiment, as an example, Windows (registered trademark) is used as an OS.

The RAM 116 includes a Static Random Access Memory (SRAM) that requires a backup power supply and the like. Data is held by a primary battery (unshown) for data backup. Incidentally, the RAM 116 stores a program control variable and the like on which data must not be erased. The RAM 116 is used as a work memory by various programs stored in the ROM 113 or external storage device 115.

The input device 117 corresponds to an operating unit that accepts an operation from a user, and includes a mouse and keys such as a numerical value input key, a mode setting key, a decision key, a cancellation key, a power supply key, and the like. The input device 117 is connected to the input I/F 111. The input I/F 111 is an interface for accepting data input or an operation instruction from the user via the input device 117. The output device 118 corresponds to a display unit that displays data or the state of the PC 110, and includes a light emitting diode (LED), a liquid crystal display (LCD), or the like. The output device 118 is connected to the output I/F 114.

The output I/F 114 is an interface that performs control for the output device 118 to perform data display or notification of the state of the PC 110. Incidentally, the input device 117 and the output device 118 may be the same constituent by using the same member to perform information display and operation acceptance. The input/output I/F 119 is connected to the input/output I/F 125 via a connection interface 130. The PC 110 and the printer 120 can communicate with each other by connecting the input/output I/F 119 with the input/output I/F 125. The input/output I/F 119 is also called a port, and is for connecting ports of a plurality of devices via the connection interface 130 to enable the devices to communicate with each other. The kinds of ports include, for example, a network port for performing connection via a network or a USB port for connecting a printer with a USB.

In the connection via the network, the network port may make a connection wirelessly and directly or via an access point installed on a wired network. Further, the connection via the network is made, for example, by a wired LAN or a wireless LAN. The examples of communication systems for connection include, for example, Wireless Fidelity (Wi-Fi), Bluetooth (registered trademark), Near Field Communication (NFC; ISO/IECIS18092), or the like. It should be noted that the network port may be prepared individually according to a communication system and a connection system. In the present embodiment, the PC 110 is connected to the printer 120 using a port 1.

The connection interface 130 is, for example, a USB or a LAN, but is not limited to them. Incidentally, communication may be carried out wirelessly and directly, or may be carried out via the access point installed on the wired network.

The printer 120 is an external device in the present embodiment. The printer 120 includes a RAM 121, a ROM 122, a print engine 123, a CPU 124, and an input/output I/F 125. The CPU 124 is a system control unit and controls the entire printer 120. The ROM 122 stores a control program executed by the CPU 124 or fixed data such as a data table.

The RAM 121 includes the Static Random Access Memory (SRAM) that requires a backup power supply and the like. Data is held by a primary battery (unshown) for data backup. Incidentally, the RAM 121 stores a program control variable on which data must not be erased. The RAM 121 is used as a work memory for the CPU 124 and is also used as a buffer for the temporary storage of received data.

The print engine 123 forms an image on a print medium such as paper using a printing material such as ink based on the data stored in the RAM 121 and the print job received from the PC 110 and outputs a print result. The input/output I/F 125 is connected to the input/output I/F 119 via the connection interface 130.

Figure 2:
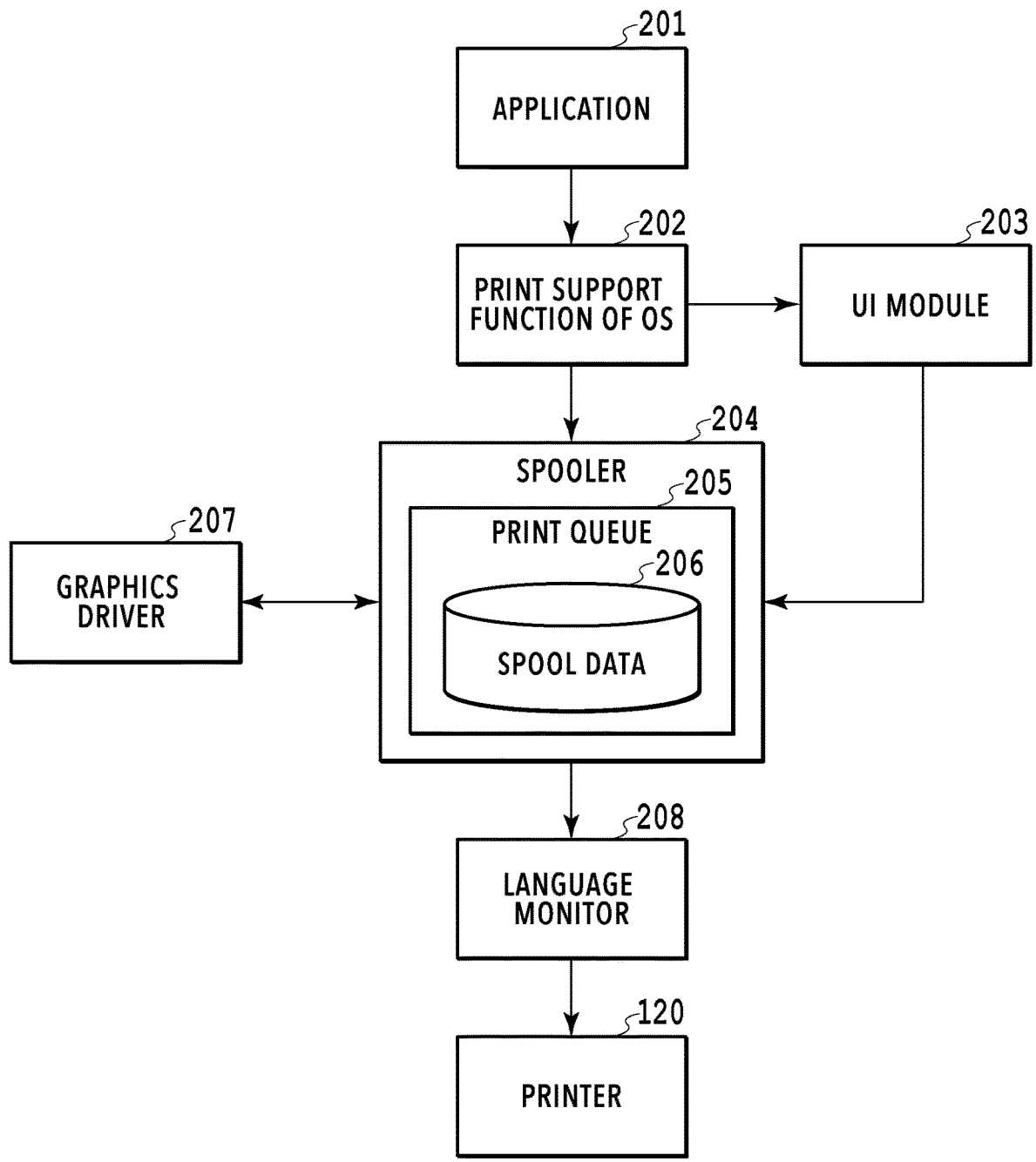
FIG. 2 is a diagram showing a configuration of software provided in a PC.

FIG. 2 is a diagram showing a software configuration provided in the PC. An application 201 is stored in the external storage device 115, can operate on the information processing apparatus, and forms print data including image information on paid contents to be printed, rendering information including character information, print setting information such as a paper size or layout, and the like. The print setting information returned from a UI module 203 via a print support function 202 of the OS is added to the print data formed by the application 201, and the print data is temporarily stored in a print queue 205 in a spooler 204 as spool data 206.

The spooler 204 has a job management function and holds and manages the passed spool data 206 until the spooler 204 recognizes that the transmission of a print job according to the spool data 206 has been completed. Specifically, the spooler 204, for example, manages the size or job name of the print job for each printer and conveys the managed information to the status display application to display the information on the output device 118 or the like. Alternatively, in case of an error such as a paper jam, the spool data 206 may be held until the end of the job including the print data. The information on the spool data 206 stored in the print queue 205 can be referred to using a predetermined interface function via, for example, a graphics driver 207, the UI module 203, the application 201, or the like.

The spool data 206 is converted by the graphics driver 207 into a print command which can be interpreted by the printer 120, and a print job is generated. The generated printed job is transmitted from the spooler 204 to the language monitor 208. By the language monitor 208, the print job is divided into packets of a specific size and is transmitted to the printer 120 one by one via the input/output I/F 119 and input/output I/F 125. At this time, the size of the data to be transmitted at one time is instructed by the spooler 204. The spooler 204 executes the instruction by being instructed by the application 201 or the UI module 203. Examples of the functions of the language monitor 208 include the function of obtaining information on the state of the printer 120 or the job input into the printer 120. Incidentally, the job is, for example, a print job, a scan job, or a maintenance job. The PC 110 transmits the job to the printer 120 to cause the printer 120 to execute processing such as printing, scanning, or maintenance according to the job. In the software configuration diagram shown in FIG. 2, each constituent may be any one module of the OS and the printer driver. Processing executed by each constituent is implemented by the CPU 112 reading a program corresponding to each constituent from the external storage device 115, loading the program into the RAM 116, and executing the program.

FIG. 3 is a diagram showing an example of the print queue 205. In the present embodiment, a description is given on the assumption of a print queue in Windows (registered trademark) of Microsoft Corporation. The print queue 205 is a graphical user interface that holds and manages the spool data 206 passed to the spooler 204 until the spooler 204 recognizes that the transmission of print jobs according to the spool data 206 has been completed. The print queue displays information on the processing statuses of the spool data 206 and the print jobs generated by the graphics driver 207 from the spool data 206.

A printer name display unit 301 displays a printer name. A document name display unit 302 displays the names of the spool data 206 and the print jobs generated by the graphics driver 207 from the spool data 206. In FIG. 3, "JOB A" and "JOB B" are displayed. A state display unit 303 displays the states of the spool data 206 and the print jobs generated by the graphics driver 207 from the spool data 206. For example, a case where PRINTING IS BEING PERFORMED is displayed shows that print processing is being executed in the printer 120. A case where nothing is displayed shows that the spool data 206 is in a print standby state such as in the process of generating or transmitting a print job. In the following description, such spool data 206 in a print standby state is called a print job standing by.

An owner display unit 304 displays an owner of the spool data 206 and the print jobs generated by the graphics driver 207 from the spool data 206. That is, the name of a user who has executed print processing is displayed. A number-of-page display unit 305 displays the number of pages of the spool data 206 and the print jobs generated by the graphics driver 207 from the spool data 206. The print job according to the spool data 206 is held and managed until it is recognized that the transmission of the print job according to the spool data 206 has been completed. The example in FIG. 3 shows that there are print jobs in which a job A which is to print three pages owned by a user A is being processed, and a job B which is to print one page owned by the user A stands by. The job B is processed after the print processing of the job A ends and the displayed job A disappears.

There is the function of causing the spooler 204 provided in the PC to hold a job until job processing by the printer is completed and monitoring the state of the job. Hereinafter, this processing will be referred to as job holding processing. More specifically, in the job holding processing, even in a case where the transmission of the job is completed in reality, an EndJob command, which is a command to delete the job from the print queue 205, is not transmitted to the spooler 204. As a result, the transmitted job is left in the print queue 205. Performing the job holding processing makes it possible to monitor the state of the job until the printer 120 completes the job processing by using the function of the language monitor 208. Specifically, the language monitor 208 can monitor the state of the job such as the presence or absence of an error in job processing and whether the job processing has been completed. Further, the user has an advantage that the job can be cancelled before the job processing is completed by the printer.

While there is the advantage as described above, the job is held until the job processing is completed by the printer while the job holding processing is performed. Thus, in a case where there is a next job in the print queue 205, there is also a disadvantage that the next job is not processed until the processing of the job which is being processed is completed. Specifically, for example, the processes of generating and transmitting a print job of the printer driver are performed after the processing of the job currently in the process of printing is completed and the held job disappears. Thus, during time after the job which is being printed is completed until the graphics driver 207 generates a next print job, the printer 120 does not perform print processing, which causes loss of time. As a result, print processing for multiple jobs takes longer than a case where the job holding processing is not performed.

Considering the above advantage and disadvantage of the job holding processing, a case where the job holding processing is optimized in a case where the printer processes a plurality of jobs will be considered. In the following embodiment, a description will be given of a method of appropriately switching between the start of the job holding processing and the end of the job holding processing depending on a situation to perform the printing processing of the multiple jobs without loss of time while monitoring the state of a job.

Figure 4:
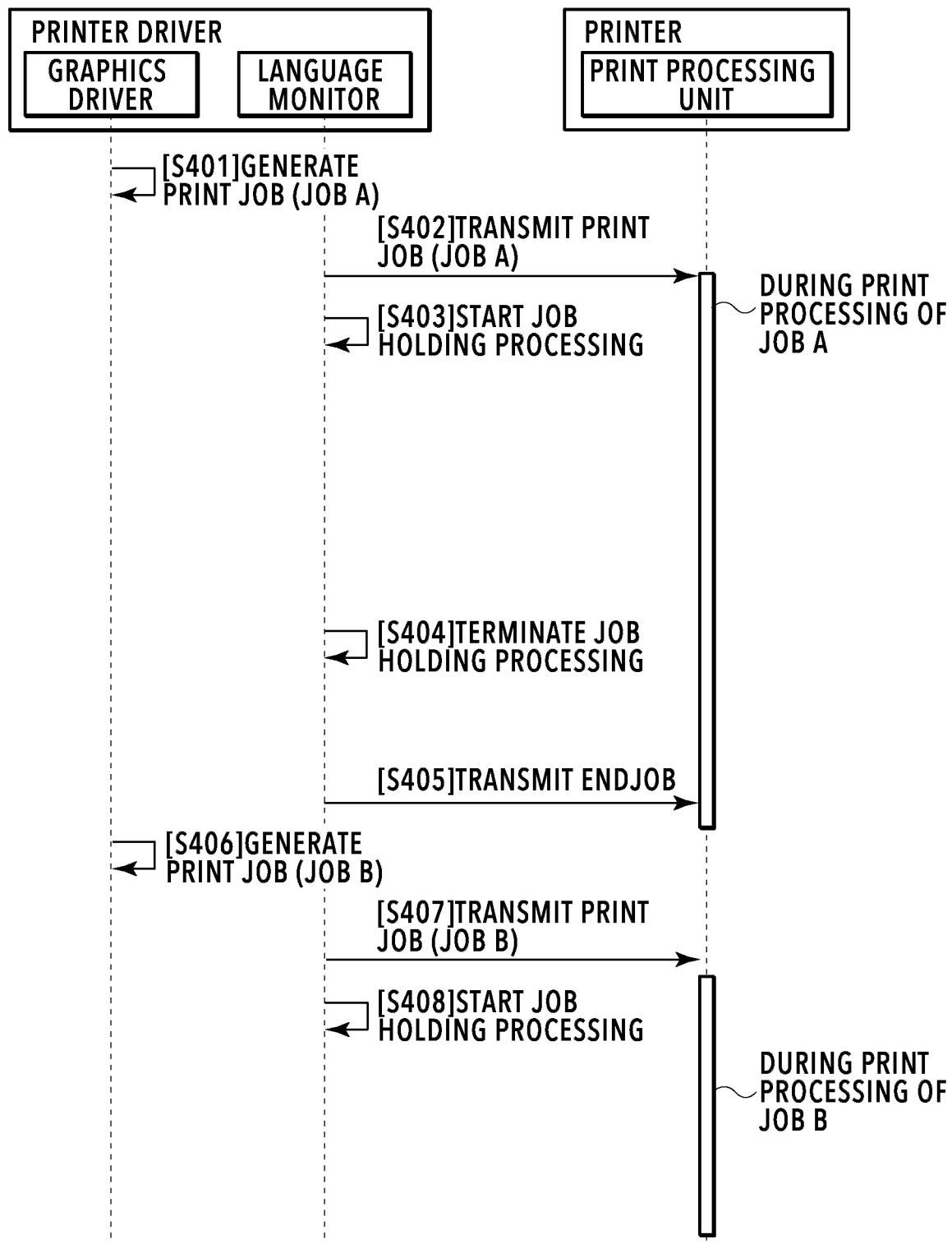
FIG. 4 is a processing flow chart in a case where job holding processing is not optimized.

FIG. 4 is a flowchart for processing the print queue in FIG. 3. First, with reference to the present figure, a description will be given of normal job holding processing which is not optimized. A series of steps shown in the present flowchart is performed by the CPU 112 of the information processing apparatus expanding a program code stored in the ROM 113 or external storage device 115 into the RAM 116 and executing the program code. In the following description of each processing operation, "S" means a step in the flowchart, and the same applies to subsequent embodiments.

First, in S401, in a case where the job A is registered in the print queue 205, the graphics driver 207 provided in the external storage device 115 of the PC generates a print job based on the job A. After generating the print job, the graphics driver 207 transmits the generated print job from the spooler 204 to the language monitor 208. In S402, the language monitor 208 transmits the print job to the printer 120. At the time of transmission of the print job, the language monitor 208 does not transmit the EndJob command indicating the end of the job, but transmits another command to be transmitted. As a result, the spooler 204 recognizes that the transmission of the print job has not been completed and thus does not delete the job A from the print queue 205 so that the job A remains held. The printer 120 receives the print job at a print processing unit of the print engine 123 and performs print processing.

In a case where the print processing is executed, the language monitor 208 starts the job holding processing in S403. The job holding processing is processing to monitor the print processing status of the job A in the printer 120 and keep holding the EndJob command without transmitting the EndJob command until the print processing of the job A ends, and the job holding processing continues until the print processing of the job A ends. In a case where the printer 120 terminates printing of the job A, the language monitor 208 terminates the job holding processing in S404 and transmits the remaining EndJob command to the printer 120 in S405.

Since transmission of all print jobs to the printer 120 is finished by transmitting the EndJob command, the job A is deleted from the print queue 205. In a case where the job A is deleted, in S406, the graphics driver 207 generates a print job based on the job B which was on standby. After generating the print job based on the job B, the graphics driver 207 then transmits the generated print job from the spooler 204 to the language monitor 208.

In S407, the language monitor 208 transmits the print job based on the job B to the printer 120. At this time, the language monitor 208 does not transmit the EndJob command, but transmits another command to be transmitted, as in the processing in S402. The printer 120 receives the print job at the print processing unit of the print engine 123 and starts print processing. In S408, the language monitor 208 starts the job holding processing. Since steps S404 and S405 are performed afterwards, a description thereof is omitted.

The above is a description of a processing flow without optimizing the job holding processing. In the case of the present processing flow, the job holding processing of the job A is performed until the print processing of the job A in the printer 120 ends. As a result, the print job based on the job B is generated and transmitted after the print processing of the job A ends, so that the job B is not started smoothly after the print processing of the job A in the printer 120 ends, and loss of time occurs.

Figure 5:
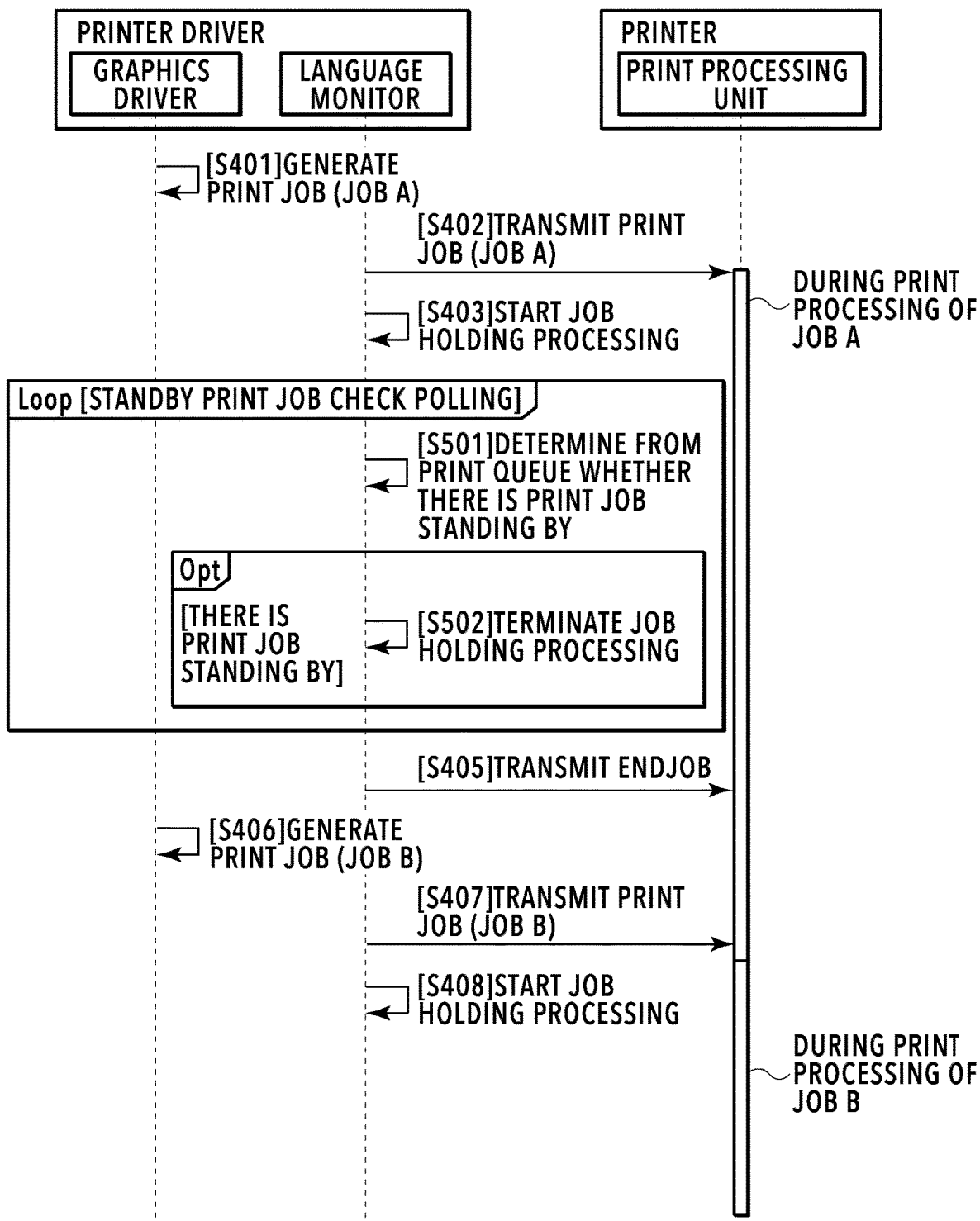
FIG. 5 is a processing flow chart in a case where the job holding processing is optimized.

FIG. 5 is a processing flow chart in which the job holding processing is optimized. In the present figure, since S401 to S403 are the same as S401 to S403 in FIG. 4, a description thereof is omitted.

In S501, after starting the job holding processing of the job A, the language monitor 208 starts to determine whether there is a print job standing by in the print queue 205. That is, polling processing is started to check whether there is a job standing by. This determination is continuously performed until the end of printing of the job A or it is determined that there is a job standing by in the print queue 205. It should be noted that whether there is a print job standing by in the print queue 205 is determined by obtaining print information from the print queue 205 and based on the contents of the obtained print information. The print information is information including information on a print job standing by. In a case where a print job standing by is confirmed before the end of print processing, in S502, the language monitor 208 terminates the job holding processing without waiting for the end of printing. The language monitor 208 then transmits the EndJob command to the printer 120 in S405.

By transmitting the EndJob command, the language monitor 208 can determine that transmission of all print jobs to a main unit is finished and thus deletes the job A from the print queue 205 without waiting for the end of print processing of the job A in the printer 120. After the job A is deleted, in S406, the graphics driver 207 generates a print job based on the job B which was on standby. In S407, the language monitor 208 then transmits the print job based on the job B without waiting for the end of the print processing of the job A in the printer 120. In a case where print processing is executed, the language monitor 208 starts the job holding processing of the job B in S408. Since steps from S501 are performed afterwards, a description thereof is omitted.

The above is a description of the processing flow of the present embodiment in which the job holding processing is optimized. In the case of the present processing flow, while the printer 120 is performing print processing, it is checked whether there is a print job standing by. In a case where there is no print job standing by in the print queue 205, the job holding processing is continued. On the other hand, in a case where it is determined that there is a print job standing by in the print queue 205, the job holding processing is terminated, and print processing of the print job standing by is generated and transmitted without waiting for the end of the print processing in the printer 120. As a result, it is possible to immediately start the print processing of the print job standing by and to reduce loss of time. Further, while there is no print job standing by, it is possible to monitor a print job in the process of printing.

Figure 6:
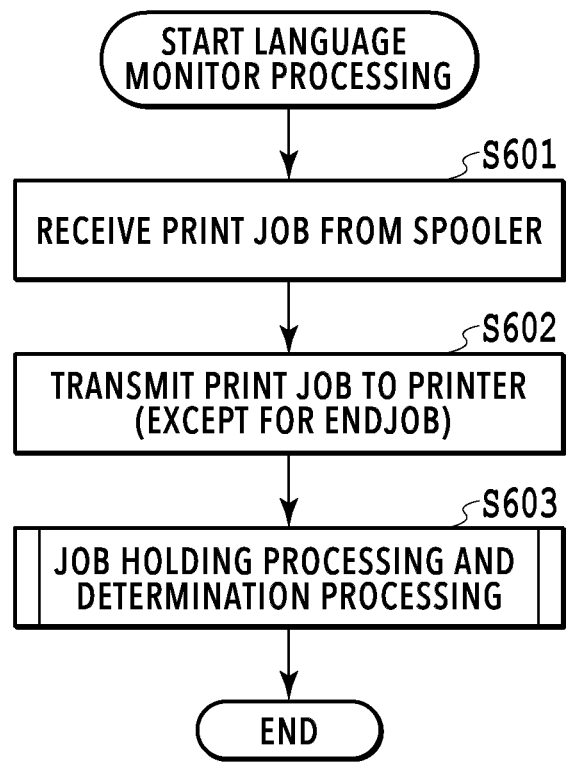
FIG. 6 is a diagram showing processing of a language monitor.

FIG. 6 is a flowchart in the case of focusing on the processing performed by the language monitor 208 in FIG. 5. A series of steps shown in the present flowchart is performed by the CPU 112 of the information processing apparatus expanding the program code stored in the ROM 113 or the external storage device 115 into the RAM 116 and executing the program code.

First, in S601, the language monitor 208 provided in the external storage device 115 of the PC receives a print job from the spooler 204. After receiving the print job, the language monitor 208 transmits the print job to the printer in S602. At this time, the language monitor 208 transmits the print job excluding the EndJob command. After transmitting the print job excluding the Endjob command, the language monitor 208 performs the job holding processing and determination processing in S603. Then, the present flow ends.

Figure 7:
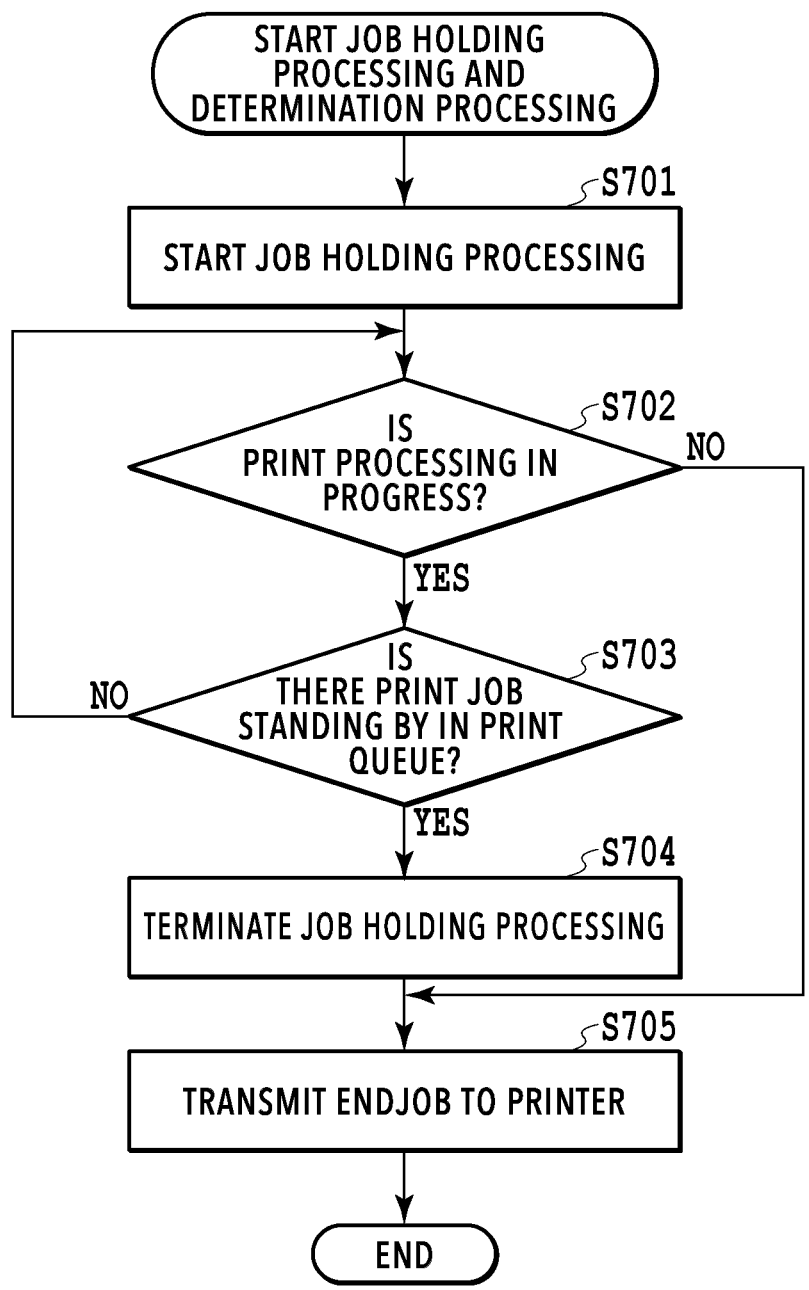
FIG. 7 is a diagram showing the job holding processing and determination processing.

FIG. 7 is a flowchart showing the job holding processing and determination processing in S603 in FIG. 6. First, the language monitor 208 starts job holding processing in S701. In S702, the language monitor 208 checks whether the printer 120 is performing print processing. In a case where the print processing is not in progress, it is determined that the print processing has been terminated, and the process proceeds to S705. On the other hand, in a case where the print processing is in progress, the process proceeds to S703. In S705, the language monitor 208 transmits the EndJob command and terminates the present flow.

In S703, the language monitor 208 determines whether there is a print job standing by in the print queue 205. In a case where there is no print job standing by, the process returns to S702. On the other hand, in a case where there is a print job standing by, the process proceeds to S704, and the language monitor 208 terminates the job holding processing. In S705, the language monitor 208 then transmits the EndJob command to the printer 120 and terminates the present flow.

As described above, according to the present embodiment, it is possible to suitably switch between the start and end of the job holding processing. Specifically, during print processing in the printer 120, it is possible to appropriately switch between continuation and termination of the job holding processing depending on whether there is a print job standing by in the print queue 205. As a result, while there is no print job standing by in the print queue 205, it is possible to monitor a print job in the process of printing. In a case where there is a print job standing by in the print queue 205, the job holding processing is terminated, so that spool data in the process of printing is deleted from the print queue 205, and a print job for the print job standing by is generated and transmitted during print processing. Accordingly, there is no time during which the printer 120 does not perform processing, and the print processing of the print job standing by can be started after the end of printing.

Second Embodiment

In the first embodiment described above, the description is given of the process of switching between continuation and termination of the job holding processing depending on whether there is a print job standing by in the print queue 205. In the present embodiment, a description will be given of a method in which in a case where there is a print job standing by during print processing in the printer 120, the page number of a page in the process of printing is obtained from the printer 120 to switch between subsequent processes depending on the page number of the page which is being printed. Specifically, a description will be given of a method of performing the process of determining whether to perform the job holding processing to be terminated during the process of printing the last page.

Figure 8:
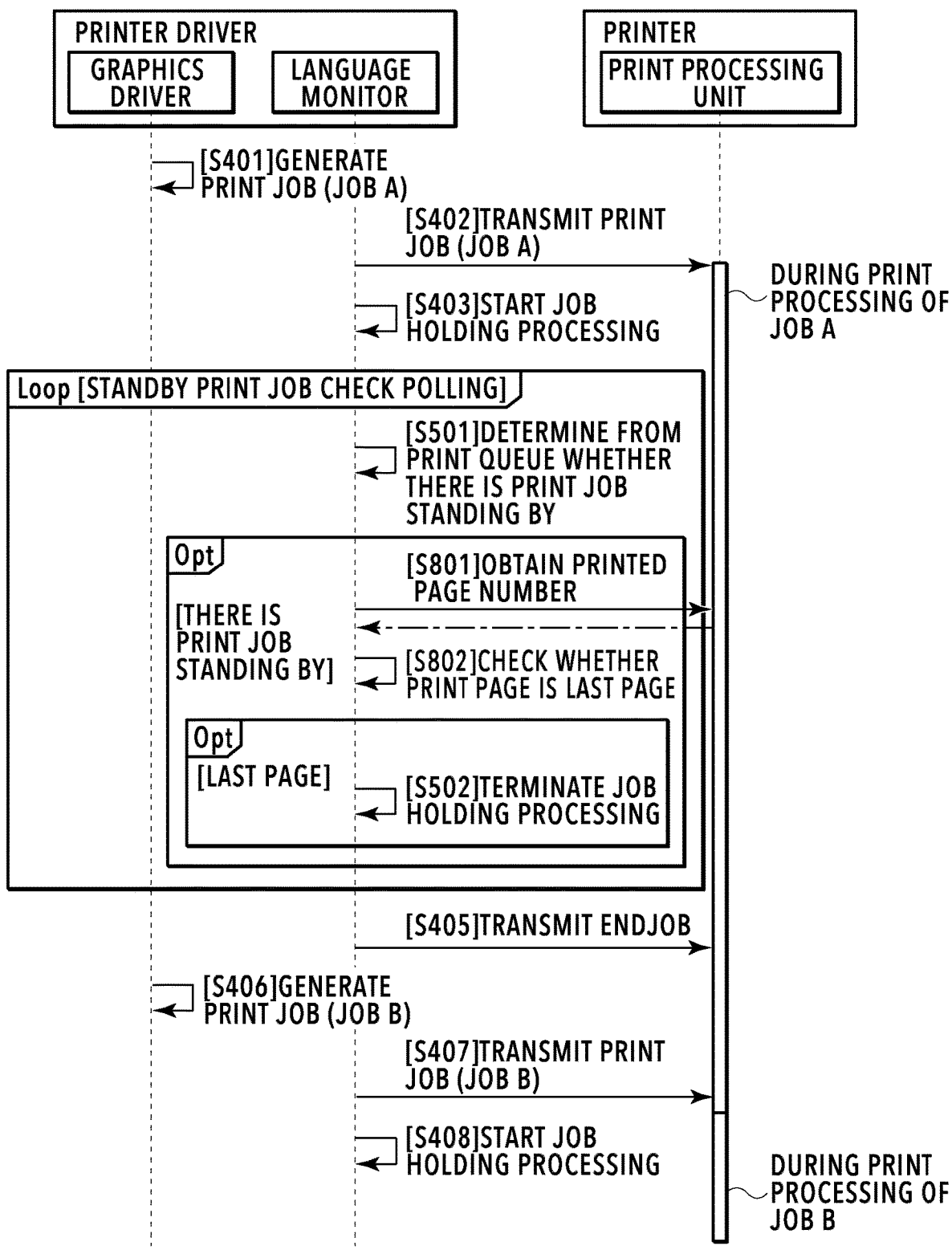
FIG. 8 is a diagram for explaining the job holding processing.

FIG. 8 is a processing flow chart according to the second embodiment. Since S401 to S501 are the same as S401 to S501 in FIG. 5, a description thereof is omitted.

In a case where it is determined in S501 that there is a print job standing by, the language monitor 208 obtains the current page number of a page in the process of printing from the printer 120 in S801. In S802, the language monitor 208 determines whether the last page of the print job is being printed based on information in the number-of-page display unit 305 in the print queue 205 and the obtained page number. In a case where the obtained page number is not the last page, the polling processing for checking the print job standing by is continued. On the other hand, in the case of the last page, the language monitor 208 terminates the job holding processing in S502. The present step will be described using the example of the job A in FIG. 3. In a case where the obtained page number is the first page or the second page, the language monitor 208 determines that the page is not the last page. In a case where the obtained page number is the third page, the language monitor 208 determines that the page is the last page and terminates the job holding processing. Since S405 to S408 are the same as those in FIG. 5, a description thereof is omitted.

Figure 9:
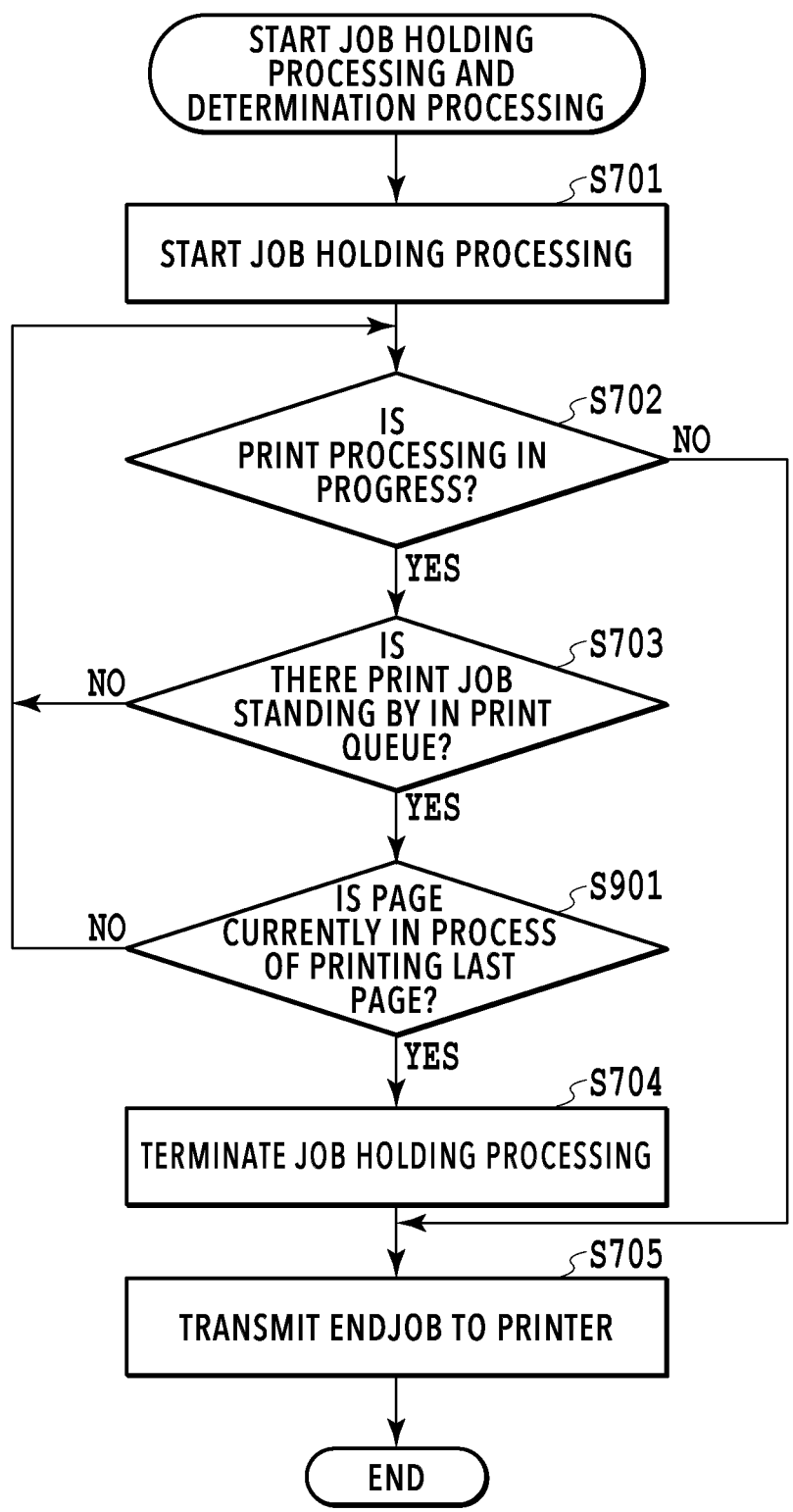
FIG. 9 is a diagram showing determination processing as to whether to perform the job holding processing.

FIG. 9 is a flowchart showing the process of determining whether to perform the job holding processing according to the second embodiment. Since S603 to S703 are the same as those in FIG. 7, a description thereof is omitted.

In S901, the language monitor 208 obtains the current page number of a page in the process of printing from the printer 120 and determines whether the last page of the print job is printed based on the print job and the obtained page number. In a case where the page which is being printed is not the last page, the process returns to S702. In a case where the page which is being printed is the last page, the process proceeds to S704. In S704, the language monitor 208 terminates the job holding processing. Since S705 and subsequent steps are the same as those in FIG. 7, a description thereof is omitted.

As described above, according to the present embodiment, in a case where it is determined that there is a print job standing by in the print queue 205, it is possible to determine whether to perform or terminate the job holding processing depending on whether the print job in the process of printing is the last page. As a result, it is possible to monitor the state of the job from the print queue 205 or cancel the print job by performing the job holding processing before the last page. Further, by terminating the job holding processing on the last page, the printer 120 can start the print processing of the next print job without loss of time.

Third Embodiment

In the second embodiment, the description is given of processing in which in a case where there is a print job standing by, it is determined whether to perform or terminate the job holding processing depending on whether the print job in the process of printing is the last page. In the present embodiment, a description will be given of processing in which in a case where there is a print job standing by, it is determined whether to perform or terminate the job holding processing based on a user setting.

Figure 10:
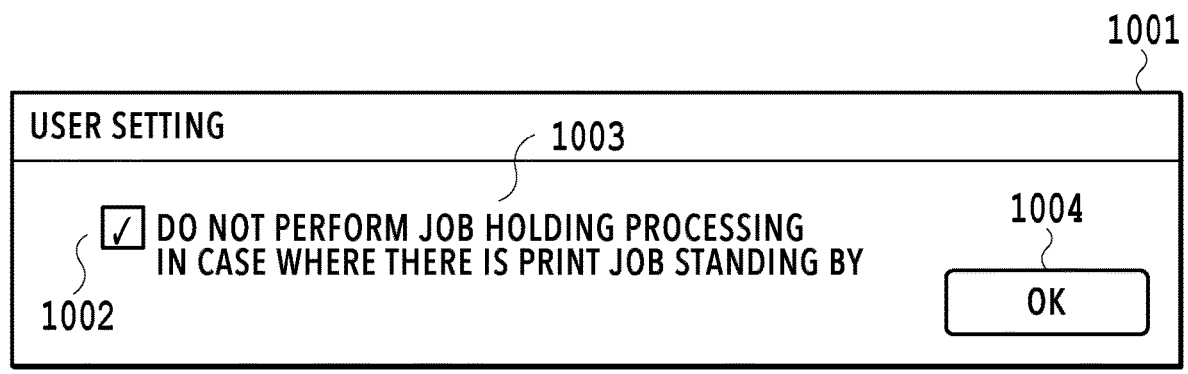
FIG. 10 is a diagram showing a display screen to make a setting as to whether to perform the job holding processing.

FIG. 10 is a diagram showing a setting screen for setting whether to perform or terminate the job holding processing in a case where there is a print job standing by. The display of the setting screen is controlled, for example, by the UI module 203.

The UI module 203 displays a user setting dialog 1001. The user setting dialog 1001 includes a setting item display area 1002, and a check box in the setting item display area 1002 can be used to set whether to perform the job holding processing in a case where there is a print job standing by.

The user uses the checkbox via an input device such as a mouse to set whether to perform the job holding processing in a case where there is a print job standing by. In the present embodiment, in FIG. 10, in a case where a check mark is placed in the check box, for example, by a click operation, a setting is made such that the job holding processing is not performed in a case where there is a print job standing by. After setting, an OK button 1004 is pressed to apply the setting.

As described above, the user can set whether to perform the job holding processing in a case where there is a print job standing by. It should be noted that the user setting dialog 1001 may display a plurality of setting items. Additionally, a setting may be made by a method other than using the check box.

Figure 11:
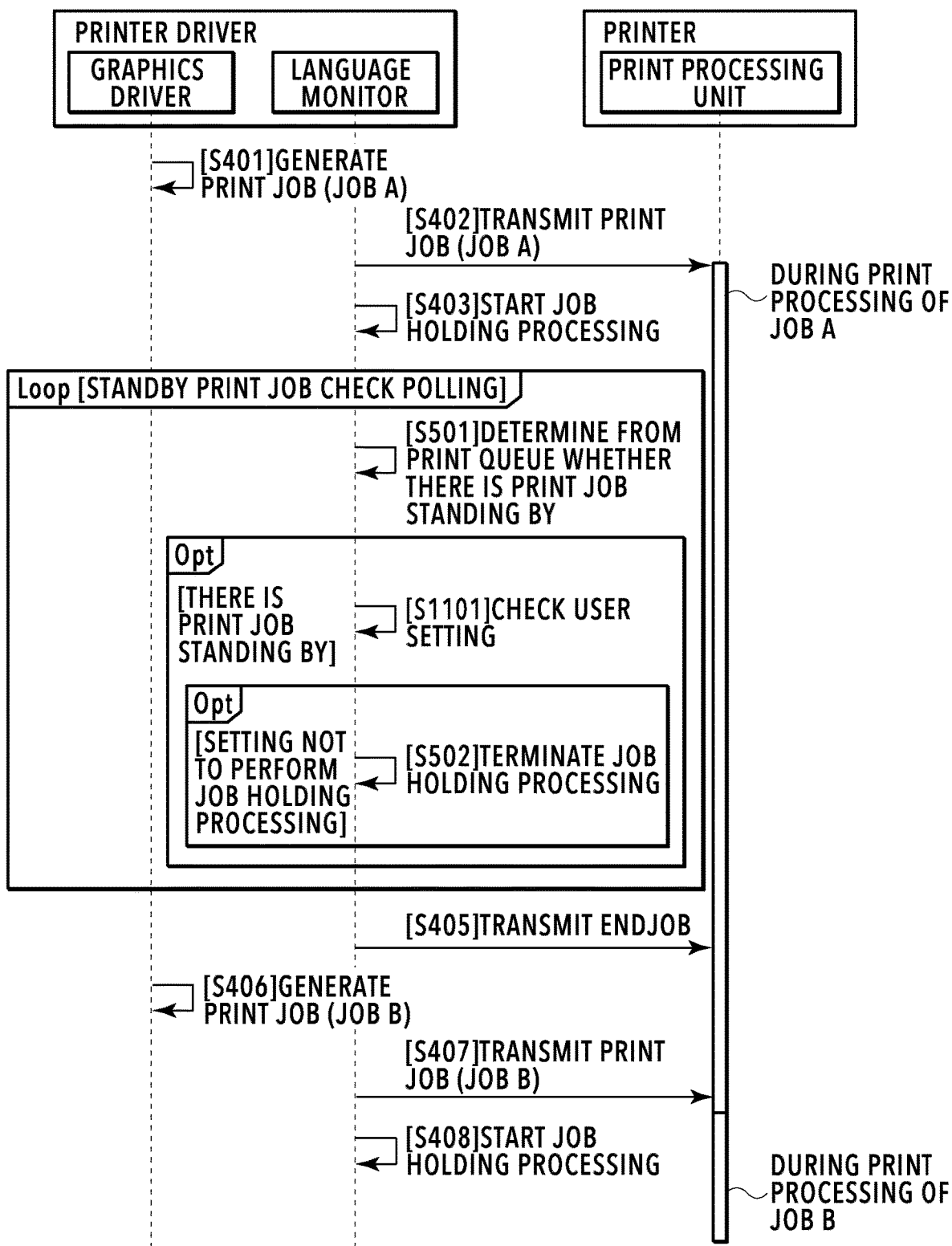

FIG. 11 is a processing flow chart in which it is determined whether to perform the job holding processing in a case where there is a print job standing by in accordance with the user setting shown in FIG. 10. Since S401 to S501 are the same as those in FIG. 5, a description thereof is omitted.

In a case where it is determined in S501 that there is a print job standing by, in S1101, the language monitor 208 checks the setting made by a user as to whether to perform the job holding processing. In a case where the setting is made to perform the job holding processing, the polling processing for checking the print job standing by is continued. In a case where the setting is made not to perform the job holding processing, the process proceeds to S502 to terminate the job holding processing. Since S405 to S408 are the same as those in FIG. 5, a description thereof is omitted.

Figure 12:
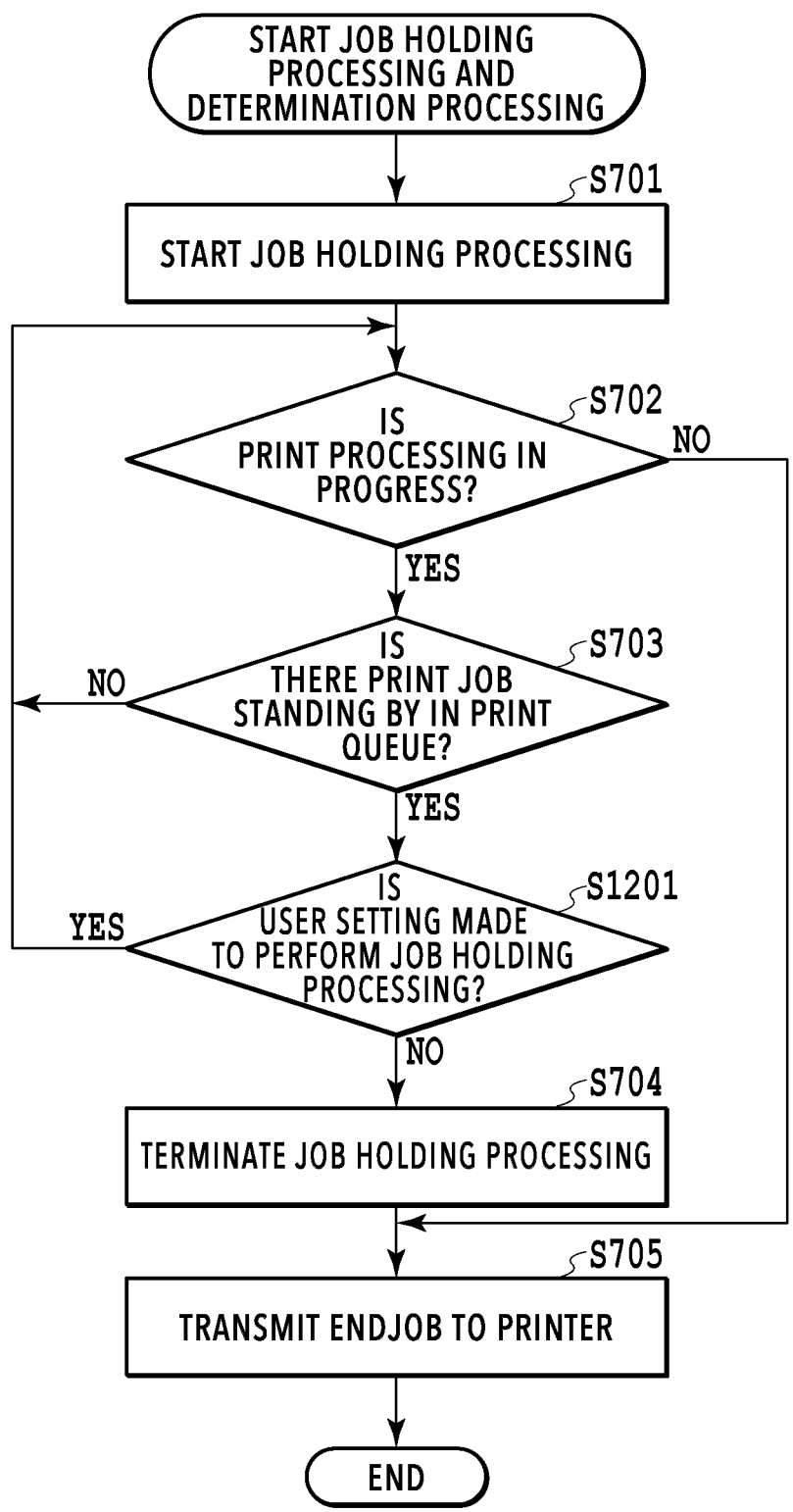
FIG. 12 is a diagram showing determination processing as to whether to perform the job holding processing in a user setting.

FIG. 12 is a flowchart showing the process of determining whether to perform the job holding processing according to the user setting. Since S603 to S703 are the same as those in FIG. 7, a description thereof is omitted. In a case where it is determined in S703 that there is a print job standing by in the print queue 205, the language monitor 208 determines in S1201 whether setting is made to perform the job holding processing in the user setting shown in FIG. 10. In a case where the setting is made to perform the job holding processing, the process returns to S702. In a case where the setting is made not to perform the job holding processing, the process proceeds to S704 to terminate the job holding processing. Since S705 and subsequent steps are the same as those in FIG. 7, a description thereof is omitted.

As described above, according to the present embodiment, it is possible to switch between continuation and termination of the job holding processing depending on whether there is a print job standing by in the print queue 205 according to the user setting. As a result, it is possible to provide an advantage that it is possible to select for each user or for each situation in which print processing is performed, whether to place importance on state monitoring in a print queue or on eliminating loss of time from the print processing.

It should be noted that the user setting in FIG. 10 may be made in the printer 120. In that case, a check on the user setting in S1101 is obtained from the printer 120. Alternatively, a combination with the process of determining whether the print job in the process of printing in the second embodiment is the last page may be made. In a case where a setting is made in the printer 120, it is desirable that the setting be made through a touch panel or the like of the printer 120.

Fourth Embodiment

In the third embodiment, the description is given of the processing in which it is determined whether there is a print job standing by in the print queue 205. In the present embodiment, an aspect will be described in consideration of a case where print jobs are transmitted from a plurality of PCs to the printer 120 connected to the network.

While the printer 120 is performing print processing of a print job of a user of a certain PC, a print job is to be transmitted from a user of another PC. At this time, a case where the printer 120 has specifications such that a next print job is not accepted until the printer 120 receives the EndJob command in the process of printing will be considered. At this time, since the EndJob command is not transmitted until the job holding processing ends and the print job standing by is not accepted until the print processing ends, the print job of the user of another PC enters a standby state.

On the other hand, in the process of determining whether there is a print job standing by in the print queue 205, a print job status for each user cannot be determined only by the print queue 205 of an individual user. Therefore, since a user who has a print job in the process of printing does not know the status of another user's print queue, the job holding processing is continued, and no print job is transmitted from another PC until the end of the print processing and the end of the job holding processing. Accordingly, since the next print job is not received even after the print processing ends, printing of a next job cannot be started immediately, resulting in loss of time. First, the details of the above example are shown below with reference to the drawings.

FIGS. 13A and 13B show an example of the print queue 205 of each user in a case where multiple users execute printing in the printer 120. First, as shown in FIG. 13A, the user A executes printing and transmits a print job based on the job A to the printer 120, so that the printer 120 performs print processing. After that, the user B, who is different from the user A, executes printing. Since there is no print job standing by in the print queue of the user B of a PC different from the user A's PC, the process of generating a print job based on the job B is performed, and transmission of the generated print job based on the job B to the printer 120 is attempted. At that time, the printer 120 has not received the EndJob command for the print job based on the job A in the process of printing and thus fails the transmission of the print job based on the job B shown in FIG. 13B and enters a standby state.

Figure 14:
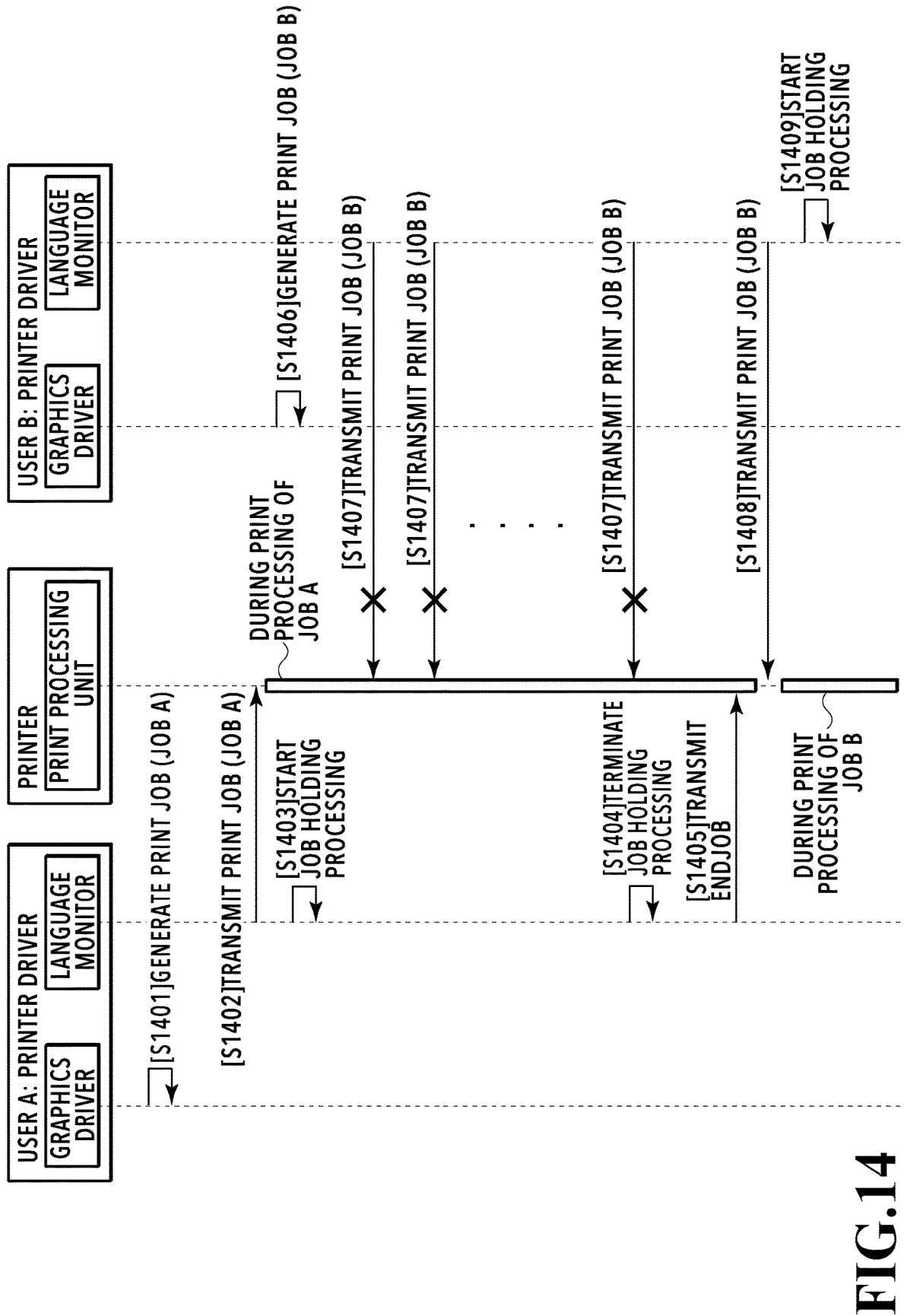
FIG. 14 is a diagram for explaining the job holding processing in a case where multiple users execute printing.

FIG. 14 is a processing flow in a case where the job holding processing is performed on the print queue shown in FIGS. 13A and 13B without optimization. A series of steps shown in the present flowchart is performed by the CPUs of the PCs operated by the user A and the user B, respectively, expanding a program code stored in a ROM or an external storage device into a RAM and executing the program code.

First, in S1401, in a case where the job A is registered in the user A's print queue, the graphics driver 207 of the printer driver generates a print job. After the print job is generated, the generated print job is transmitted from the spooler 204 to the language monitor 208.

In S1402, the language monitor 208 transmits the print job to the printer 120. At this time, the language monitor 208 does not transmit the EndJob command indicating the end of the print job, but transmits another command to be transmitted. Not transmitting the EndJob command enables the job A to be held without being deleted from the print queue 205.

In S1403, the printer 120 receives the print job at the print processing unit of the print engine 123 and performs print processing. In a case where the print processing is executed, the language monitor 208 starts the job holding processing. The job holding processing is processing to monitor the print processing status of the job A in the printer 120 and keep holding the EndJob command without transmitting the EndJob command until the print processing of the job A ends and thus continues until the print processing of the job A ends.

After the printing of the job A in the printer 120 ends, the language monitor 208 terminates the job holding processing in S1404. The language monitor 208 then transmits the remaining EndJob command in S1405. Since transmission of all print jobs to the main unit is finished by transmitting the EndJob command, the job A is deleted from the print queue 205.

On the other hand, another PC different from the PC operated by the user A in S1406 generates a print job based on the job B by the user B's operation while the job A is in the process of printing. In S1407, the language monitor of another PC transmits the generated print job to the printer 120. However, the printer 120 has not received the EndJob command based on the job A in the process of printing and thus does not accept the print job based on the job B and fails in transmission. Since the transmission has failed, the language monitor of another PC repeatedly attempts transmission until the transmission is successfully made.

By receiving the EndJob command for the job A, the printer 120 becomes able to receive a print job. Thus, in S1408, the transmission of the job B transmitted by the language monitor of another PC is successfully made. The printer 120 starts print processing of the received job B. In S1409, the language monitor of another PC then starts the job holding processing of the job B.

The above is the processing flow in a case where jobs are accepted from a plurality of PCs and where the job holding processing is performed without optimization. Since the printer 120 has not received the next print job after the print processing of the job A ends, there is a period of time during which print processing is not performed until the next print job is received, and the period of time is the loss of time. A description will be given below of a method of reducing loss of time in print processing of a plurality of jobs in a case where another user whose print job is in the process of printing has a print job standing by.

Figure 15:
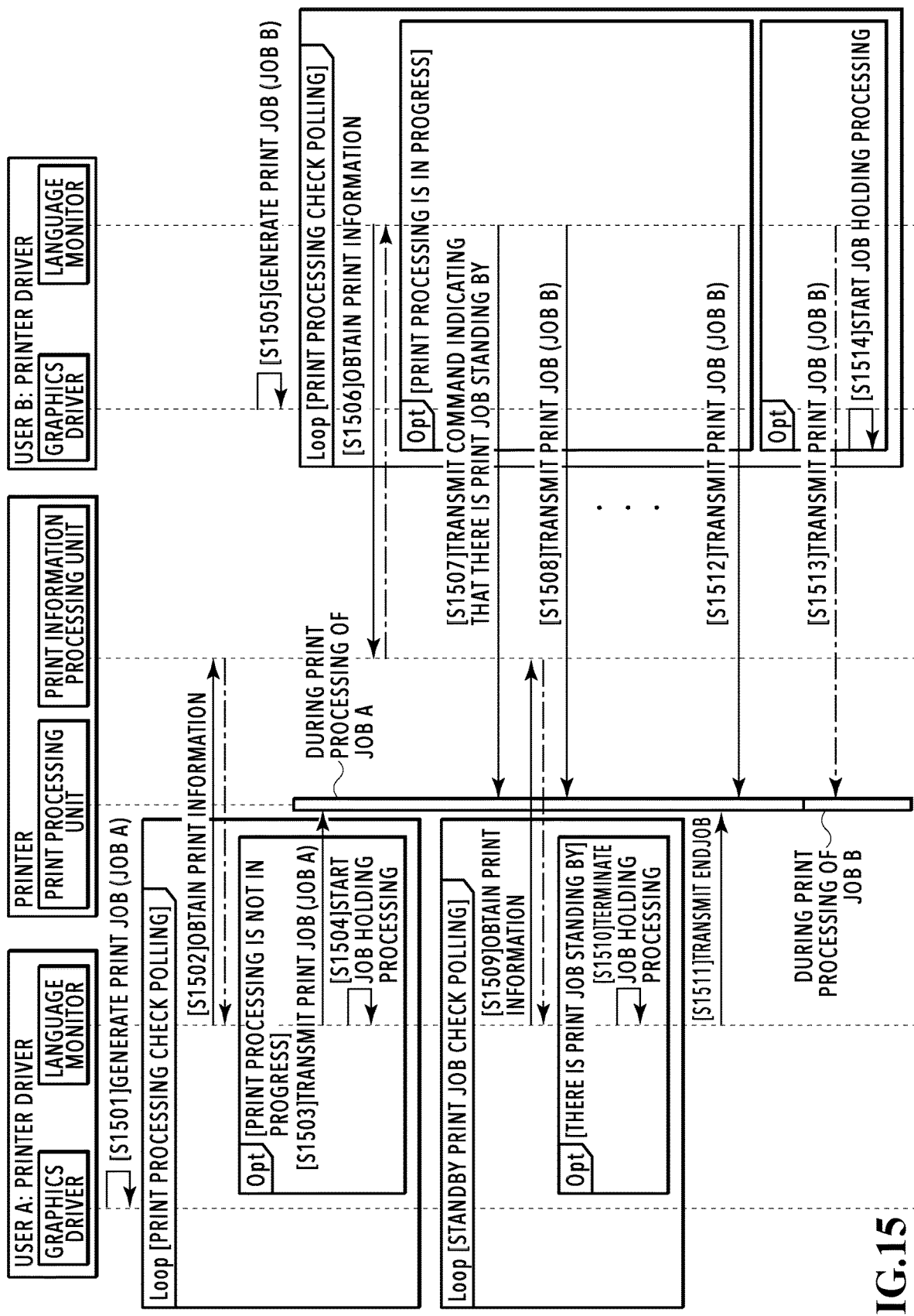
FIG. 15 is a diagram for explaining the job holding processing in a case where the multiple users execute printing.

FIG. 15 is a processing flow in the case of applying the present embodiment to the processing in FIG. 14.

After the job A is registered in the user A's print queue, the graphics driver 207 of the printer driver generates a print job in S1501. After the print job is generated, the graphics driver 207 transmits the generated print job from the spooler 204 to the language monitor 208.

In S1502, the language monitor 208 obtains print information on the printer 120 before transmitting the print job. This print information is information as to whether the printer 120 is performing print processing and whether there is a print job standing by, and is returned by a print information processing unit of the printer 120. In the first embodiment, the description is given of the example of obtaining the print information from the print queue. However, in the present embodiment, print information is obtained from a printer. Incidentally, the print information used in the present embodiment may be the same as or different from that described in the first embodiment. It is only required that at least information on a print job standing by be included. The language monitor 208 determines whether print processing is in progress from the obtained print information. As a result of the determination, in a case where the print processing is not in progress, the language monitor 208 transmits the print job in S1503. In S1504, the language monitor 208 starts the job holding processing.

On the other hand, another PC different from the PC operated by the user A in S1505 generates a print job based on the job B by the user B's operation while the job A is in the process of printing. In S1506, the language monitor of another PC obtains the print information from the printer 120 and determines from the obtained print information whether print processing is in progress. In the present flow, since the job A is in the process of printing, it is determined that the print processing is in progress. As a result, in S1507, the language monitor of another PC transmits a command indicating that there is a print job standing by to the print information processing unit of the printer 120 without transmitting the print job based on the print job B. Specifically, the port through which the printer 120 receives a print job may have specifications such that reception is impossible during print processing. Thus, the language monitor of another PC transmits the command indicating that there is a print job standing by, not a print job, to a port capable of reception and different from the port through which a print job is received.

After receiving the command indicating that there is a print job standing by, the print information processing unit of the printer 120 returns print information that there is a print job standing by until the print processing of the job B is started. In S1508, the language monitor of another PC transmits the print job based on the job B. At this point, the printer 120 has not yet received the EndJob command in the process of printing, and transmission of the print job based on the job B fails. Thus, transmission is repeated until it is successfully made.

In S1509, the language monitor 208 of the PC operated by the user A repeats obtaining of print information after the start of the job holding processing until the end of the print processing in S1504, and determines whether there is a print job standing by. In a case where it is determined from the obtained print information that there is a print job standing by, the job holding processing is terminated in S1510. In the present embodiment, since the command indicating that there is a print job standing by is transmitted in S1507, it is determined that there is a print job standing by, and the job holding processing ends.

In S1511, the language monitor 208 of the PC operated by the user A transmits the EndJob command to the printer 120. Since transmission of all print jobs to the main unit is finished by transmitting the EndJob command, the print processing in the printer 120 ends and a print job can be received. Accordingly, in S1512, the language monitor of another PC completes transmission of the print job based on the job B repeatedly performed by the user B from S1508. After that, in a case where the print processing ends, since the print job has already been transmitted, the language monitor of another PC does not make transmission in S1513 and starts the job holding processing in S1514.

As described above, the next print job can be transmitted before the printer 120 terminates print processing. Thus, the printer 120 can start the print processing of the next print job without loss of time after the end of printing.

Figure 16:
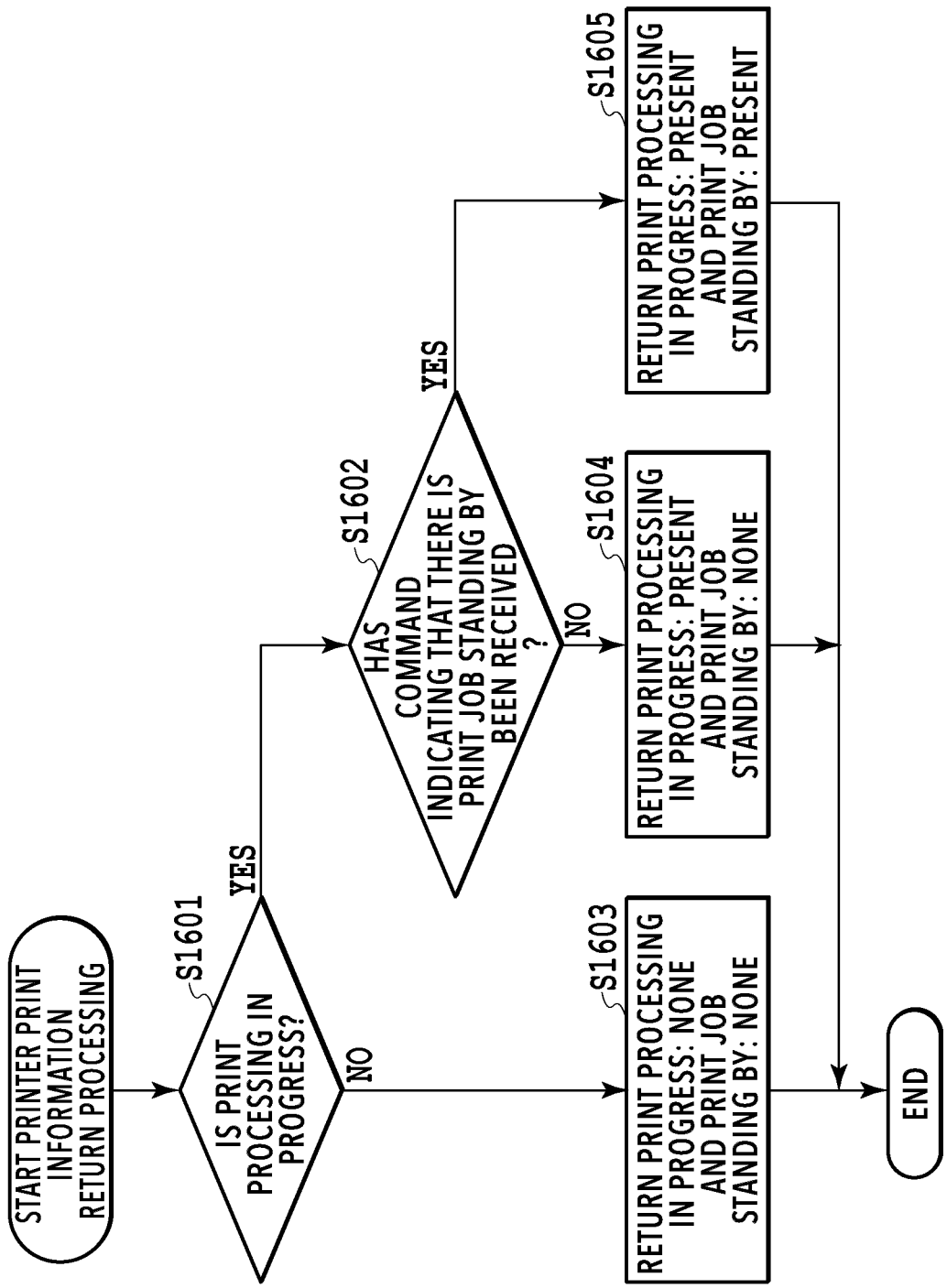
FIG. 16 is a diagram showing print information return processing in a printer.

FIG. 16 is a flowchart showing print information return processing in the printer 120. A series of steps shown in the present flowchart is performed by the CPU 124 of the printer 120 expanding the program code stored in the ROM 122 into the RAM 121 and executing the program code. The present processing is started by the printer 120 receiving a print information obtaining request from the PC.

In S1601, the printer 120 determines whether print processing is in progress. In a case where the printer 120 determines in S1601 that print processing is not in progress, the process proceeds to S1603 and returns information stating "PRINT PROCESSING IN PROGRESS: NONE" and "PRINT JOB STANDING BY: NONE." On the other hand, in a case where it is determined that print processing is in progress, the process proceeds to S1602 to determine whether the command indicating that there is a print job standing by has been received. In a case where the printer 120 determines in S1602 that the command indicating that there is a print job standing by has not been received, information stating "PRINT PROCESSING IN PROGRESS: PRESENT" and "PRINT JOB STANDING BY: NONE" is returned. In a case where it is determined that the command indicating that there is a print job standing by has been received, information stating "PRINT PROCESSING IN PROGRESS: PRESENT" and "PRINT JOB STANDING BY: PRESENT" is returned.

Figure 17:
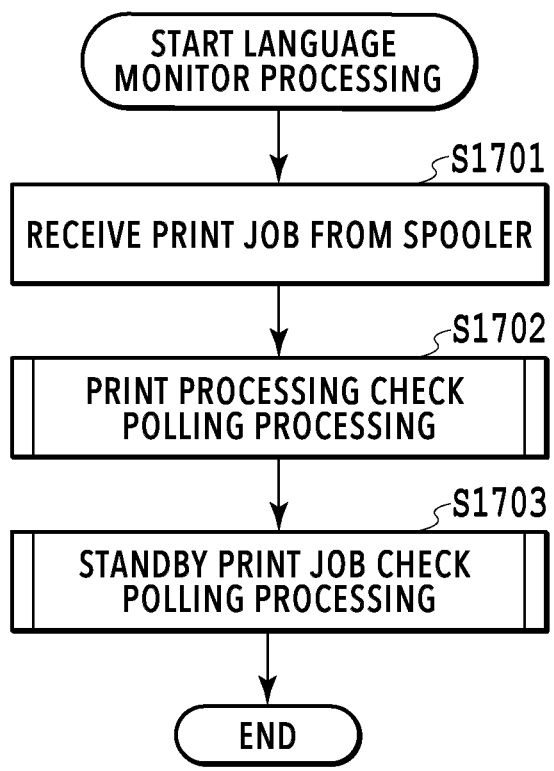
FIG. 17 is a diagram showing processing by the language monitor.

FIG. 17 is a flowchart focusing on the processing performed by the language monitor 208 of the PC operated by the user A in FIG. 16. In S1701, the language monitor 208 receives a print job from a spooler. Further, in S1702, the language monitor 208 performs print processing check polling processing to smoothly process print jobs from a plurality of PCs. In S1703, the language monitor 208 then performs standby print job check polling processing and terminates the present flow.

Figure 18:
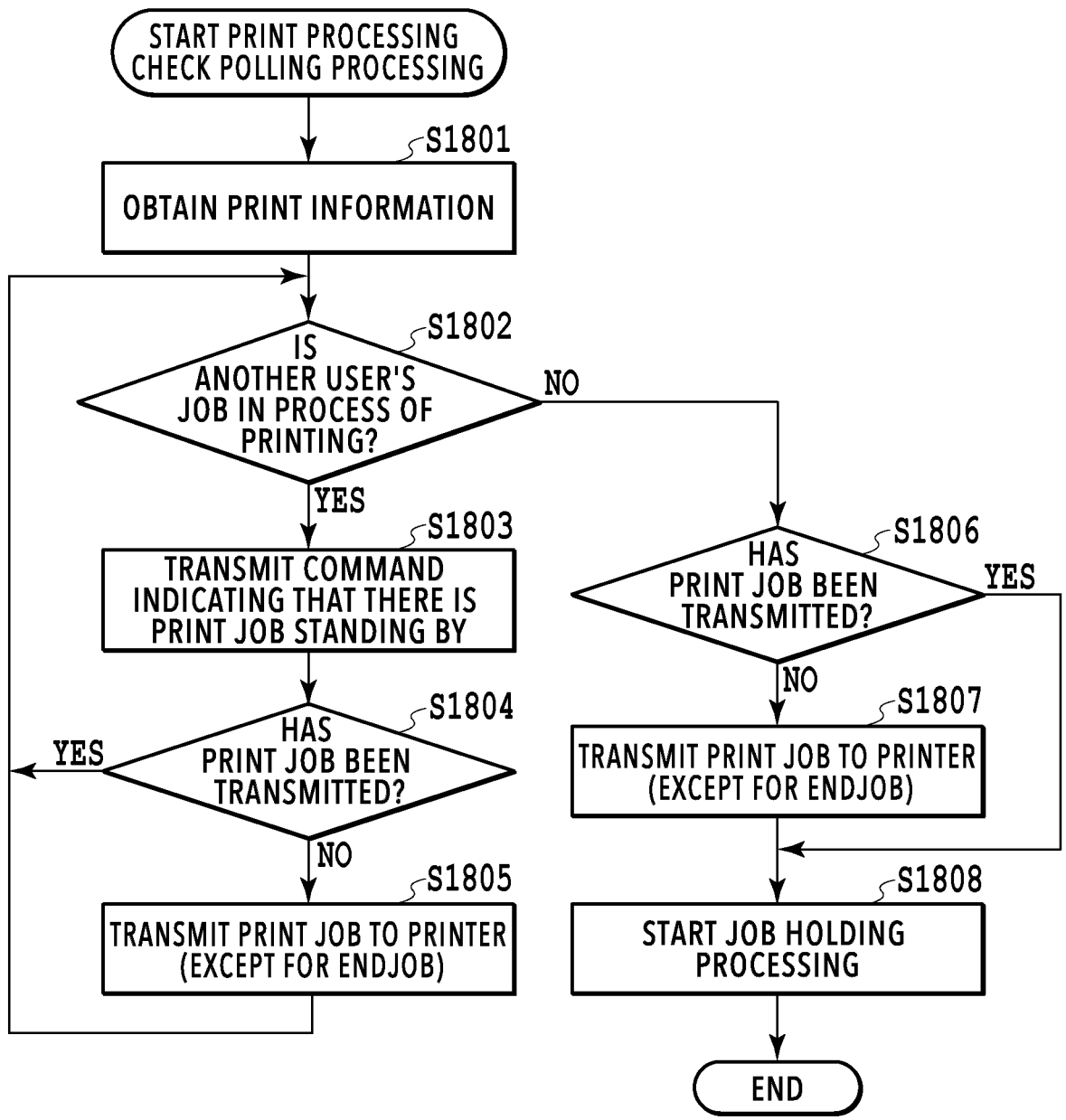
FIG. 18 is a diagram showing print processing check polling processing.
Figure 19:
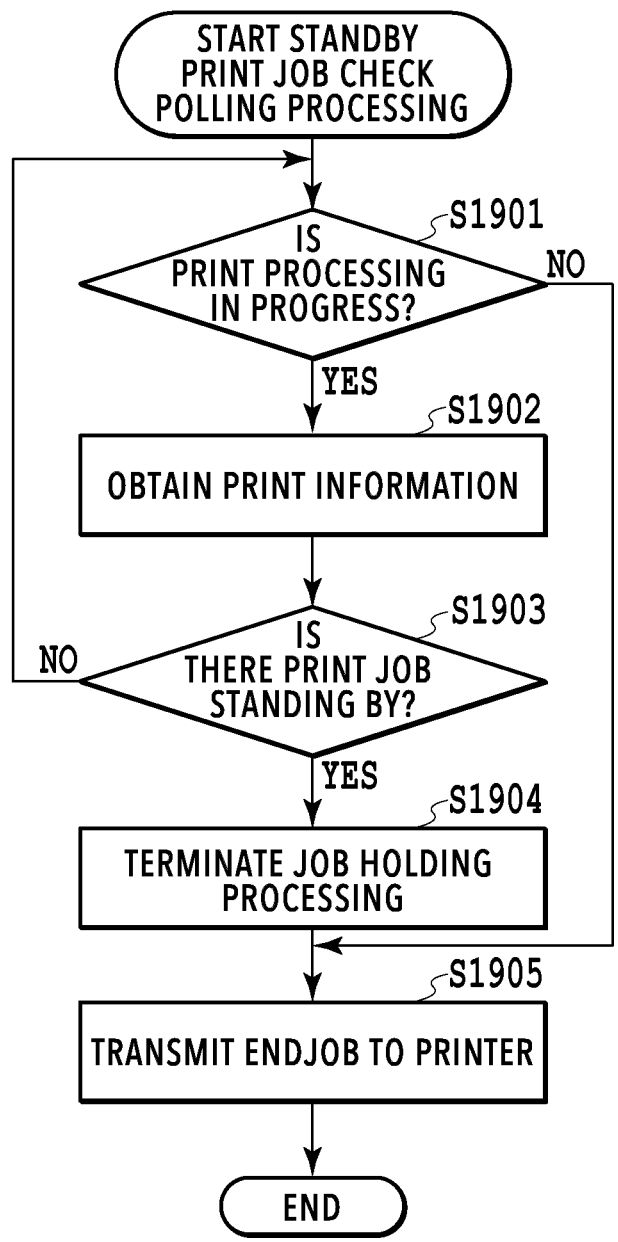
FIG. 19 is a diagram showing standby print job check polling processing.

FIGS. 18 and 19 describe in detail the print processing check polling processing and the standby print job check polling processing described in FIG. 17 above, respectively.

FIG. 18 is a flowchart showing the details of the print processing check polling processing in S1702. In S1801, the language monitor 208 of the PC operated by the user A obtains print information from the printer 120. In S1802, the language monitor 208 then determines whether the printer 120 is performing printing processing of another user's print job. As a determination method, a method may be used in which in a case where the print queue 205 indicates that its own print job is not in the process of printing and the contents of the print information obtained in S1801 are in the process of printing, another user's print job is determined to be in the process of printing.

In a case where it is determined that another user's print job is in the process of printing, the process proceeds to S1803, and the language monitor 208 transmits the command indicating that there is a print job standing by. In S1804, the language monitor 208 determines whether the print job has been transmitted. In a case where the print job has been transmitted, the process returns to S1802. On the other hand, in a case where the print job has not been transmitted, the process proceeds to S1805, and the language monitor 208 transmits the print job excluding the EndJob command to the printer 120. Then, the process returns to S1802.

That is, the language monitor 208 repeats the steps from S1802 to S1805 in a case where another user's job is in the process of printing. After printing of another user's job ends, the process proceeds to S1806 and subsequent steps.

In a case where it is determined that another user's print job is not in the process of printing, the process proceeds to S1806, and the language monitor 208 determines whether the print job in the print queue has been transmitted. In a case where it is determined that the print job has not been transmitted, the process proceeds to S1807, and the language monitor 208 transmits the print job excluding the EndJob command to the printer 120. In S1808, the language monitor 208 then starts the job holding processing and terminates the present flow.

On the other hand, in a case where the print job in the print queue has already been transmitted in S1806, the process proceeds to S1808, and the language monitor 208 starts the job holding processing. After that, the present flow is terminated.

FIG. 19 is a flowchart for the standby print job check polling processing in S1703 in FIG. 17. First, in S1901, the language monitor 208 determines from the print queue whether print processing is in progress. In a case where the print processing is not in progress, the process proceeds to S1905, and the language monitor 208 transmits the EndJob command to the printer 120 and terminates the present flow. In a case where the print processing is in progress, the process proceeds to S1902, and the language monitor 208 obtains print information from the printer 120. In S1903, the language monitor 208 then determines from the obtained print information whether there is a print job standing by. In a case where it is determined that there is no print job standing by, the process returns to S1901, and S1901 to S1903 are repeated until the end of printing. In a case where there is a print job standing by in S1903, the process proceeds to S1904, and the language monitor 208 terminates the job holding processing. Then, in S1905, the EndJob command is transmitted to the printer 120, and the present flow is terminated.

The above is a processing flow according to the present embodiment. Even in a case where print jobs are transmitted from multiple users of multiple PCs, it is possible to determine whether there is a print job standing by, the job holding processing is optimized, and print processing can be performed without loss of time. Further, the present embodiment may be combined with the processing according to the second or third embodiment as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075942, filed May 2, 2022, which is hereby incorporated by reference herein in its entirety.

What is claimed is:
1. A method of controlling an information processing apparatus, the method comprising:
   transmitting a first job to a job processing apparatus;
   executing first control for holding the first job in a job queue that the information processing apparatus has in a state where processing based on the first job is executed in the job processing apparatus; and
   executing second control for terminating holding of the first job by the job queue based on a fact that a second job is registered in the job queue in a state where the first job is held in the job queue even in a case where the processing based on the first job is executed in the job processing apparatus,
   wherein the first control includes control not to transmit an EndJob command even though transmission of the first job is completed.
2. The method of controlling according to claim 1, wherein the second control is executed based on a fact that the processing based on the first job is completed in the job processing apparatus.
3. The method of controlling according to claim 1, further comprising
   obtaining information on the processing based on the first job in a state where the first job is held in the job queue.
4. The method of controlling according to claim 3, wherein the information on the processing based on the first job includes at least one of information on an error in the processing based on the first job and information as to whether the processing based on the first job is completed.
5. The method of controlling according to claim 1, wherein after the holding of the first job by the job queue is terminated based on the fact that the second job is registered in the job queue in the state where the first job is held in the job queue, the second job is generated.
6. The method of controlling according to claim 1, wherein after the holding of the first job by the job queue is terminated based on the fact that the second job is registered in the job queue in the state where the first job is held in the job queue, the second job is transmitted.

7. The method of controlling according to claim 1, wherein the second control includes control to transmit an EndJob command.

8. The A method of controlling an information processing apparatus, the method comprising:
transmitting a first job to a job processing apparatus;
executing first control for holding the first job in a job queue that the information processing apparatus has in a state where processing based on the first job is executed in the job processing apparatus; and
executing second control for terminating holding of the first job by the job queue based on a fact that a second job is registered in the job queue in a state where the first job is held in the job queue even in a case where the processing based on the first job is executed in the job processing apparatus,
wherein the second control is executed based on a fact that the second job is registered in the job queue in the state where the first job is held in the job queue and that a page on which printing is performed based on the first job is a last page, and
wherein in a case where the page on which printing is performed based on the first job is not a last page, the second control is not executed even in a case where the second job is registered in the job queue in the state where the first job is held in the job queue.

9. A method of controlling an information processing apparatus, the method comprising:
transmitting a first job to a job processing apparatus;
executing first control for holding the first job in a job queue that the information processing apparatus has in a state where processing based on the first job is executed in the job processing apparatus;
executing second control for terminating holding of the first job by the job queue based on a fact that a second job is registered in the job queue in a state where the first job is held in the job queue even in a case where the processing based on the first job is executed in the job processing apparatus; and
as third control, executing the second control based on a fact that operation for transmission of a third job to the job processing apparatus is performed in another apparatus different from the information processing apparatus even in a case where the processing based on the first job is executed in the job processing apparatus.

10. The method of controlling according to claim 9, wherein in the state where the first job is held in the job queue, in a case where the operation for the transmission of the third job to the job processing apparatus is performed in the other apparatus, a predetermined command is transmitted from the other apparatus to the job processing apparatus,
information based on a fact that the predetermined command is transmitted to the job processing apparatus is obtained by the information processing apparatus, and
the second control is executed based on information based on the fact that the predetermined command is transmitted to the job processing apparatus.

11. The method of controlling according to claim 9, wherein the job processing apparatus does not receive the third job transmitted from the other apparatus in the state where the first job is held in the job queue.

12. The method of controlling according to claim 9, wherein the second control includes control to transmit an EndJob command to the job processing apparatus.

13. A method of controlling an information processing apparatus, the method comprising:
transmitting a first job to a job processing apparatus;
executing first control for holding the first job in a job queue that the information processing apparatus has in a state where processing based on the first job is executed in the job processing apparatus;
executing second control for terminating holding of the first job by the job queue based on a fact that a second job is registered in the job queue in a state where the first job is held in the job queue even in a case where the processing based on the first job is executed in the job processing apparatus; and
accepting a first setting or a second setting from a user, wherein
in a case where the first setting is accepted, the second control is executed based on the fact that the second job is registered in the job queue in the state where the first job is held in the job queue, and
in a case where the second setting is accepted, the second control is not executed even in a case where the second job is registered in the job queue in the state where the first job is held in the job queue.

14. The method of controlling according to claim 1, wherein the first job is at least one of a print job, a scan job, and a maintenance job.

15. The method of controlling according to claim 1, wherein the first control and the second control are executed by a language monitor.

16. The method of controlling according to claim 1, wherein the first control and the second control are executed by a program included in a printer driver.

17. An information processing apparatus comprising:
a transmission configured to transmit a first job to a job processing apparatus;
a first controller configured to execute first control for holding the first job in a job queue that the information processing apparatus has in a state where processing based on the first job is executed in the job processing apparatus; and
a second controller configured to execute second control for terminating holding of the first job by the job queue based on a fact that a second job is registered in the job queue in a state where the first job is held in the job queue even in a case where the processing based on the first job is executed in the job processing apparatus
wherein the first controller includes control not to transmit an EndJob command even though transmission of the first job is completed.

18. A non-transitory computer readable storage medium storing a program for executing a method for controlling an information processing apparatus, the method comprising:
transmitting a first job to a job processing apparatus;
executing first control for holding the first job in a job queue that the information processing apparatus has in a state where processing based on the first job is executed in the job processing apparatus; and
executing second control for terminating holding of the first job by the job queue based on a fact that a second job is registered in the job queue in a state where the first job is held in the job queue even in a case where the processing based on the first job is executed in the job processing apparatus
wherein the first control includes control not to transmit an EndJob command even though transmission of the first job is completed.

19. An information processing apparatus comprising:
a transmission configured to a first job to a job processing apparatus;

a first controller configured to execute first control for holding the first job in a job queue that the information processing apparatus has in a state where processing based on the first job is executed in the job processing apparatus; and a second controller configured to execute second control for terminating holding of the first job by the job queue based on a fact that a second job is registered in the job queue in a state where the first job is held in the job queue even in a case where the processing based on the first job is executed in the job processing apparatus, wherein the second controller is executed based on a fact that the second job is registered in the job queue in the state where the first job is held in the job queue and that a page on which printing is performed based on the first job is a last page, and wherein in a case where the page on which printing is performed based on the first job is not a last page, the second control is not executed even in a case where the second job is registered in the job queue in the state where the first job is held in the job queue.

20. An information processing apparatus comprising:

a transmission configured to transmit a first job to a job processing apparatus;

a first controller configured to execute first control for holding the first job in a job queue that the information processing apparatus has in a state where processing based on the first job is executed in the job processing apparatus;

a second controller configured to execute second control for terminating holding of the first job by the job queue based on a fact that a second job is registered in the job queue in a state where the first job is held in the job queue even in a case where the processing based on the first job is executed in the job processing apparatus; and as third control, the second controller executes the second control based on a fact that operation for transmission of a third job to the job processing apparatus is performed in another apparatus different from the information processing apparatus even in a case where the processing based on the first job is executed in the job processing apparatus.

21. An information processing apparatus comprising:

a transmission configured to transmit a first job to a job processing apparatus;

a first controller configured to execute first control for holding the first job in a job queue that the information processing apparatus has in a state where processing based on the first job is executed in the job processing apparatus;

a second controller configured to execute second control for terminating holding of the first job by the job queue based on a fact that a second job is registered in the job queue in a state where the first job is held in the job queue even in a case where the processing based on the first job is executed in the job processing apparatus; and an input configured to accept a first setting or a second setting from a user, wherein in a case where the first setting is accepted, the second control is executed based on the fact that the second job is registered in the job queue in the state where the first job is held in the job queue, and in a case where the second setting is accepted, the second controller is not executed even in a case where the second job is registered in the job queue in the state where the first job is held in the job queue.

22. A non-transitory computer readable storage medium storing a program for executing a method for controlling an information processing apparatus, the method comprising:

transmitting a first job to a job processing apparatus;

executing first control for holding the first job in a job queue that the information processing apparatus has in a state where processing based on the first job is executed in the job processing apparatus; and executing second control for terminating holding of the first job by the job queue based on a fact that a second job is registered in the job queue in a state where the first job is held in the job queue even in a case where the processing based on the first job is executed in the job processing apparatus, wherein the second controller is executed based on a fact that the second job is registered in the job queue in the state where the first job is held in the job queue and that a page on which printing is performed based on the first job is a last page, and wherein in a case where the page on which printing is performed based on the first job is not a last page, the second control is not executed even in a case where the second job is registered in the job queue in the state where the first job is held in the job queue.

23. A non-transitory computer readable storage medium storing a program for executing a method for controlling an information processing apparatus, the method comprising:

transmitting a first job to a job processing apparatus;

executing first control for holding the first job in a job queue that the information processing apparatus has in a state where processing based on the first job is executed in the job processing apparatus;

executing second control for terminating holding of the first job by the job queue based on a fact that a second job is registered in the job queue in a state where the first job is held in the job queue even in a case where the processing based on the first job is executed in the job processing apparatus; and as third control, executing the second control based on a fact that operation for transmission of a third job to the job processing apparatus is performed in another apparatus different from the information processing apparatus even in a case where the processing based on the first job is executed in the job processing apparatus.

24. A non-transitory computer readable storage medium storing a program for executing a method for controlling an information processing apparatus, the method comprising:

transmitting a first job to a job processing apparatus;

executing first control for holding the first job in a job queue that the information processing apparatus has in a state where processing based on the first job is executed in the job processing apparatus;

executing second control for terminating holding of the first job by the job queue based on a fact that a second job is registered in the job queue in a state where the first job is held in the job queue even in a case where the processing based on the first job is executed in the job processing apparatus; and accepting a first setting or a second setting from a user, wherein in a case where the first setting is accepted, the second control is executed based on the fact that the second job is registered in the job queue in the state where the first job is held in the job queue, and in a case where the second setting is accepted, the second control is not executed even in a case where the second job is registered in the job queue in the state where the first job is held in the job queue.

* * * * *